(12) United States Patent
Shapiro

(10) Patent No.: US 9,875,190 B2
(45) Date of Patent: Jan. 23, 2018

(54) DELEGATED MEDIA TRANSLATION LAYER IN A STORAGE APPLIANCE

(71) Applicant: EMC Corporation, Hopkinton, MA (US)

(72) Inventor: Michael W. Shapiro, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 15/087,794

(22) Filed: Mar. 31, 2016

(65) Prior Publication Data

US 2017/0286312 A1 Oct. 5, 2017

(51) Int. Cl.
*G06F 12/00* (2006.01)
*G06F 12/1009* (2016.01)
*G06F 12/02* (2006.01)

(52) U.S. Cl.
CPC ........ *G06F 12/1009* (2013.01); *G06F 12/023* (2013.01); *G06F 2212/1044* (2013.01)

(58) Field of Classification Search
None
See application file for complete search history.

(56) References Cited

U.S. PATENT DOCUMENTS 8,407,448 B1 * 3/2013 Hayden ............... G06F 9/45533
711/162

* cited by examiner

*Primary Examiner* — Duc Doan
(74) *Attorney, Agent, or Firm* — Chamberlain Hrdlicka

(57) ABSTRACT

In general, embodiments of the technology relate to writing data to and reading data from storage appliances. More specifically, embodiments of the technology describe a method and system whereby a global control mechanism may be established, with delegation of specific translation activities to particular storage media device.

20 Claims, 13 Drawing Sheets

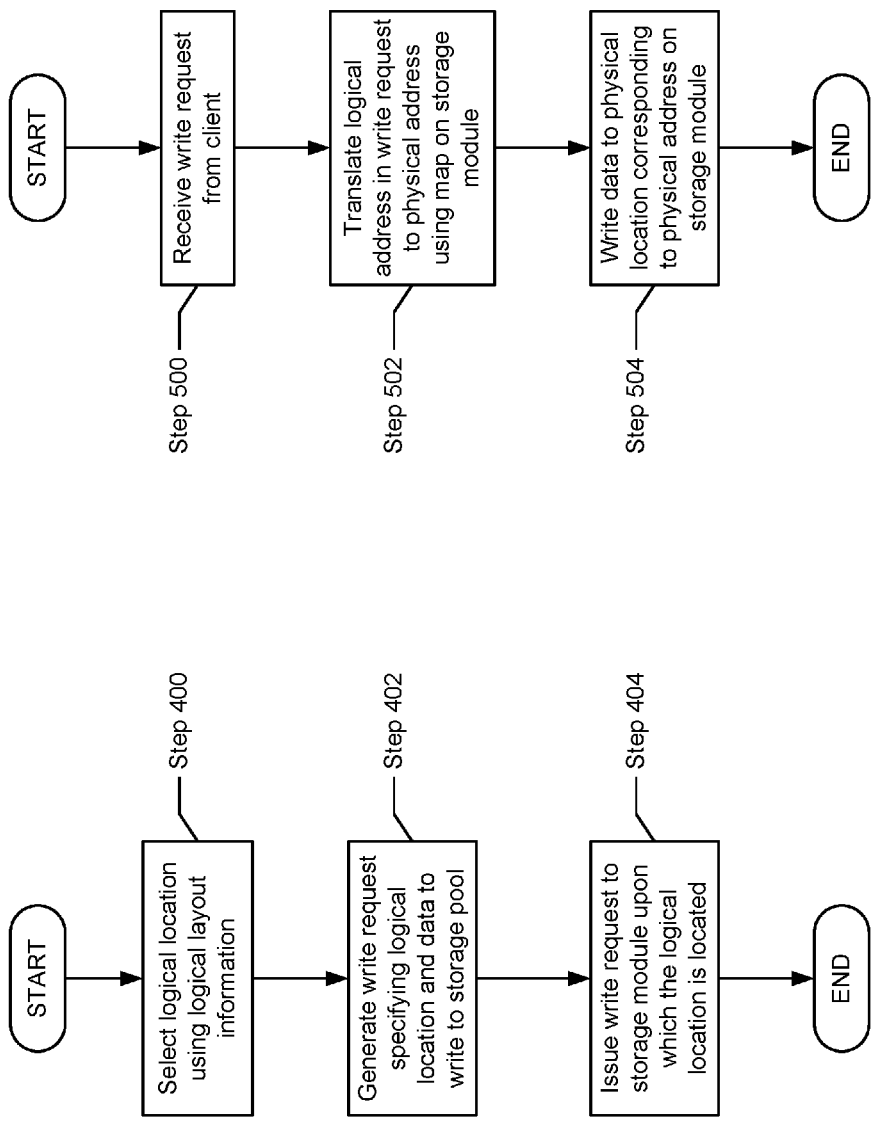

DELEGATED MEDIA TRANSLATION LAYER IN A STORAGE APPLIANCE

BACKGROUND

Storage appliances include storage media and provide a mechanism to enable clients to write data to and to read data from the storage media. In some conventional implementations, a logical to physical address translation layer is included with each storage media device. In other conventional implementations, a logical to physical address translation layer is implemented across all storage media devices by a global control mechanism.

BRIEF DESCRIPTION OF DRAWINGS

FIGS. 3-7 show flowcharts in accordance with one or more embodiments of the technology.

DETAILED DESCRIPTION

Figure 1A:
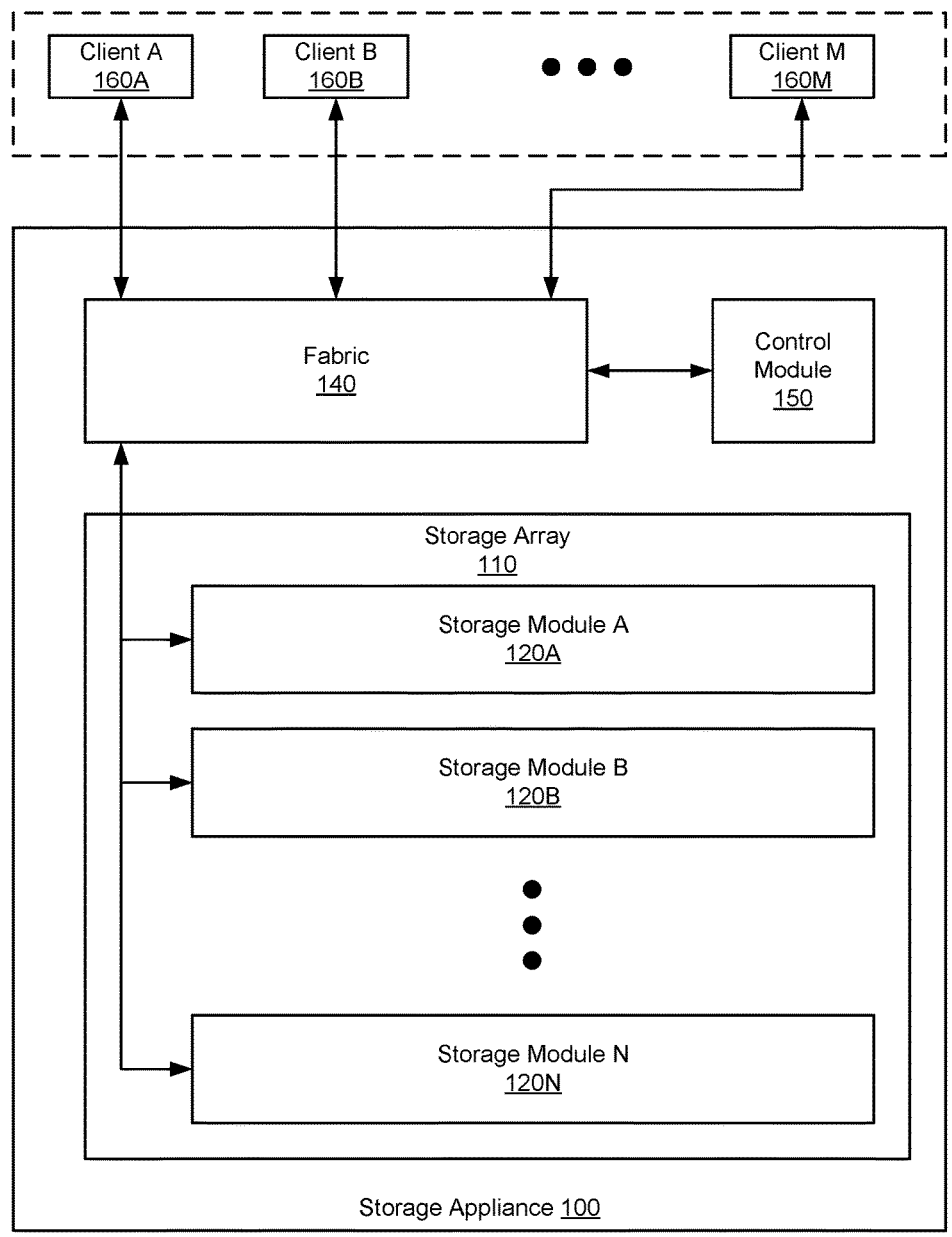
FIGS. 1A and 1B show systems in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-8G, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to writing data to and reading data from storage appliances. More specifically, embodiments of the technology describe a method and system whereby a global control mechanism may be established, with delegation of specific translation activities to particular storage media devices. More specifically, embodiments of the technology are directed to providing a delegated media translation layer (MTL). In particular, embodiments of the technology provide clients with logical layout information (e.g., information about logical locations in the storage pool to which the client may write data or from which the client may read data) and provide storage modules within the storage pool with one or more maps to translate the logical locations in the read and write requests issued by clients to corresponding physical locations within the storage pool.

Figure 1B:
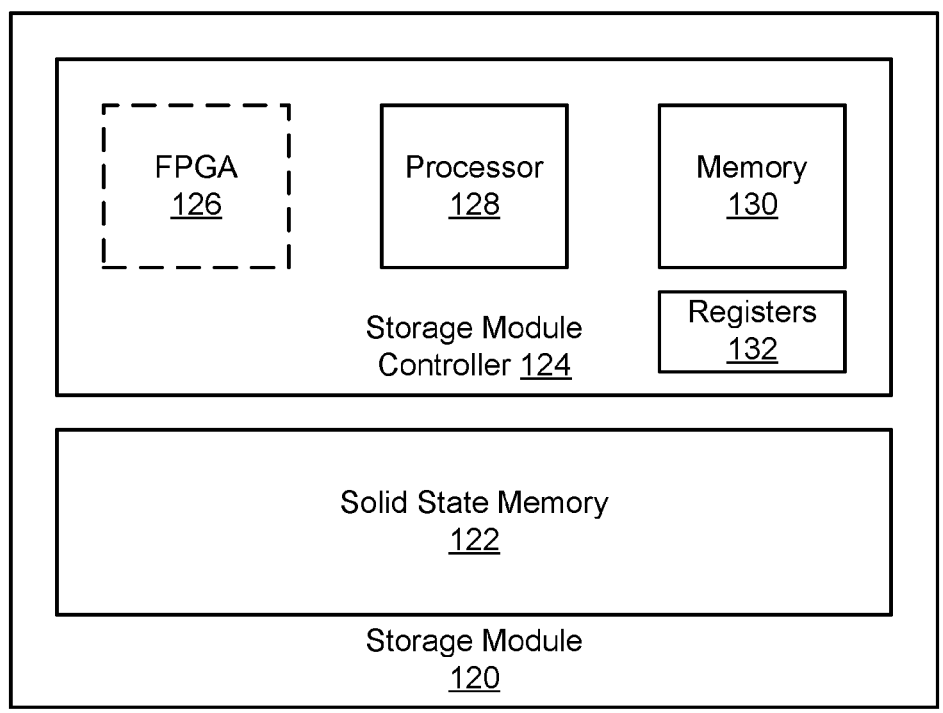

FIGS. 1A and 1B show systems in accordance with one or more embodiments of the technology. Referring to FIG. 1A, the system includes one or more clients (client A (160A)-client M (160M)) that are operatively connected to a storage appliance (100).

In one embodiment of the technology, the clients (160A-160M) may be any type of physical system that includes functionality to issue a read request to the storage appliance (100) and/or to issue a write request to the storage appliance (100). Though not shown in FIG. 1A, each of the clients (160A-160M) may include a client processor (not shown), client memory (not shown), and any other software and/or hardware necessary to implement one or more embodiments of the technology.

In one embodiment of the technology, the clients (160A-160M) are configured to execute an operating system (OS) that includes a file system. The file system provides a mechanism for the storage and retrieval of files from the storage appliance (100). More specifically, the file system includes functionality to perform the necessary actions to issue read requests and write requests to the storage appliance (100). The file system may also provide programming interfaces to enable the creation and deletion of files, reading and writing of files, performing seeks within a file, creating and deleting directories, managing directory contents, etc. In addition, the file system also provides management interfaces to create and delete file systems. In one embodiment of the technology, to access a file, the operating system (via the file system) typically provides file manipulation interfaces to open, close, read, and write the data within each file and/or to manipulate the corresponding metadata. In another embodiment of the technology, the client is configured to execute a block driver that is used to access the storage appliance. In another embodiment of the technology, the client is configured to execute an application programming interface (API) that enables the client to access the storage appliance.

In one embodiment of the technology, the clients (160A-160M) interface with the fabric (140) of the storage appliance (100) to communicate with the storage appliance (100), as further described below.

In one embodiment of the technology, the storage appliance (100) is a system that includes persistent storage such as solid state memory, and is configured to service read requests and/or write requests from one or more clients (160A-160M).

The storage appliance (100), in accordance with one or more embodiments of the technology, includes one or more storage modules (120A-120N) organized in a storage array (110), a control module (150), and a fabric (140) that interfaces the storage module(s) (120A-120N) with the clients (160A-160M) and the control module (150). Each of these components is described below.

The storage array (110), in accordance with an embodiment of the technology, accommodates one or more storage modules (120A-120N). The storage array may enable a modular configuration of the storage appliance, where storage modules may be added to or removed from the storage appliance (100), as needed or desired. A storage module (120), in accordance with an embodiment of the technology, is described below, with reference to FIG. 1B.

Continuing with the discussion of the storage appliance (100), the storage appliance includes the fabric (140). The fabric (140) may provide physical connectivity between the clients (160A-160M), the storage module(s) (120A-120N) and the control module (150) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the technology is not limited to the aforementioned protocols.

Further, in one or more embodiments of the technology, the storage appliance (100) includes the control module (150). In general, the control module (150) is a hardware module that may be configured to perform administrative tasks such as allocating and de-allocating regions in the storage modules (120A-120N) and making allocated memory regions accessible to the clients (160A-160M). In one embodiment of the technology, these functions (e.g., one or more of the steps described in FIG. 3) are performed by the control module (150).

The control module (150) interfaces with the fabric (140) in order to communicate with the storage module(s) (120A-120N) and/or the clients (160A-160M). The control module may support one or more of the following communication standards: PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE), or any other communication standard necessary to interface with the fabric (140).

FIG. 1B shows a storage module, in accordance with one or more embodiments of the technology. The storage module (120) includes solid-state memory (122) to persistently store data. In one embodiment of the technology, the solid-state memory (122) of the storage module (120) may include, but is not limited to, Spin-Torque Magnetic RAM (ST-MRAM), Phase Change Memory (PCM), NAND Flash memory and NOR Flash memory. Further, the NAND Flash memory and the NOR flash memory may include single-level cells (SLCs), multi-level cell (MLCs), or triple-level cells (TLCs). Generally, the solid state memory (122) may correspond to any type of memory that has a finite number of program-erase cycles. In one or more embodiments of the technology, the limited number of program-erase cycles or write cycles necessitates the use of methods to avoid excessive writes to the same region of the solid state memory in order to prevent data loss, as described in detail below. Those skilled in the art will appreciate that the technology is not limited to the solid state memory; rather, embodiments of the technology may implemented using any type of persistent storage.

Continuing with the discussion of the storage module (120), shown in FIG. 1B, the storage module (120), in accordance with one or more embodiments of the technology, further includes a storage module controller (124). In one embodiment of the technology, the storage module controller (124) is configured to receive and service requests to read from and/or write data to the solid state memory (122). These requests may originate from the clients (160A-160M) or control module (150) and may be conveyed to the storage module controller (124) via the fabric (140). Further, the storage module controller (124) may perform or may support administrative tasks including the methods described in FIGS. 3, 5 and 7.

Figure 3:
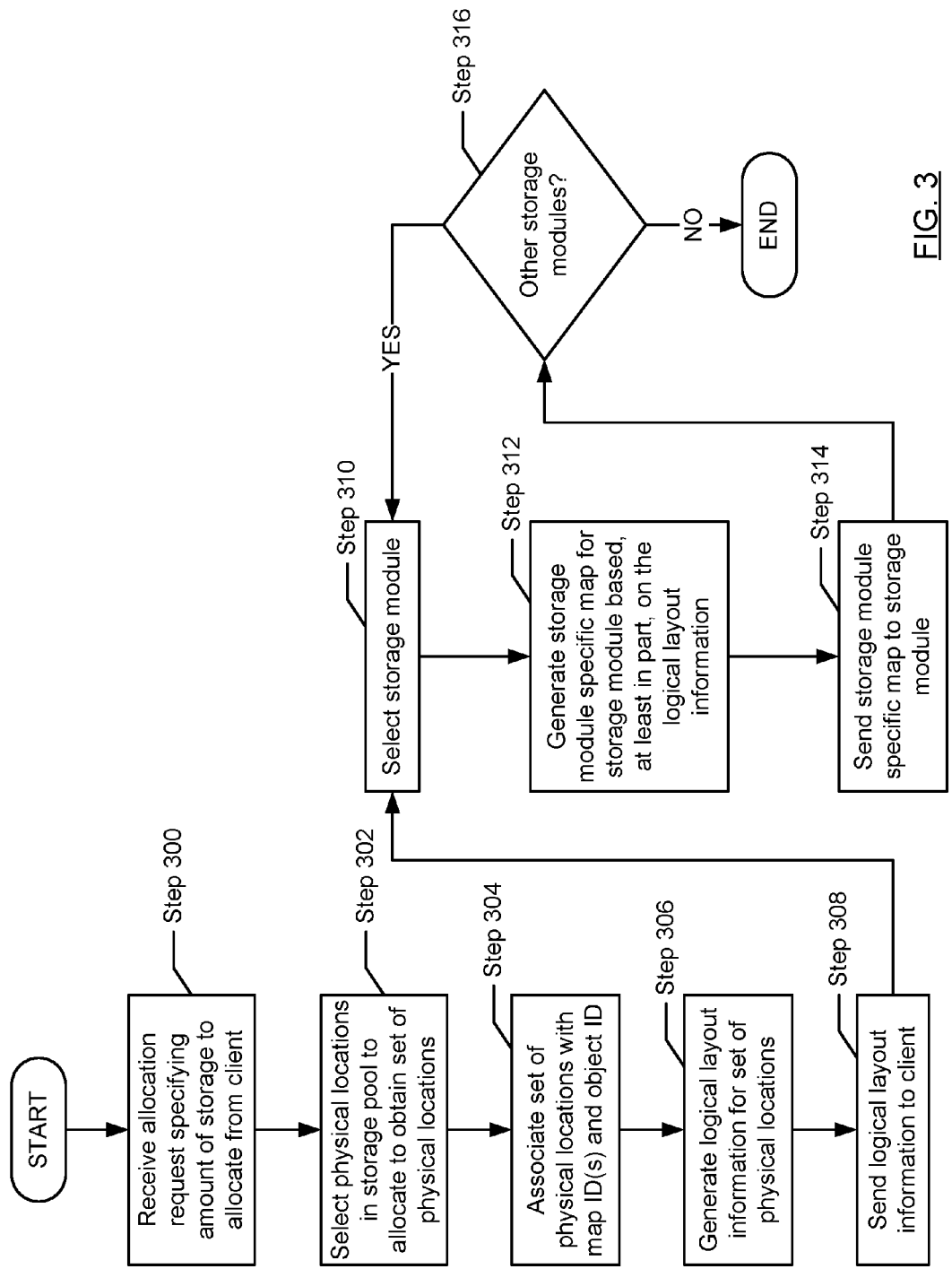
Figure 7:
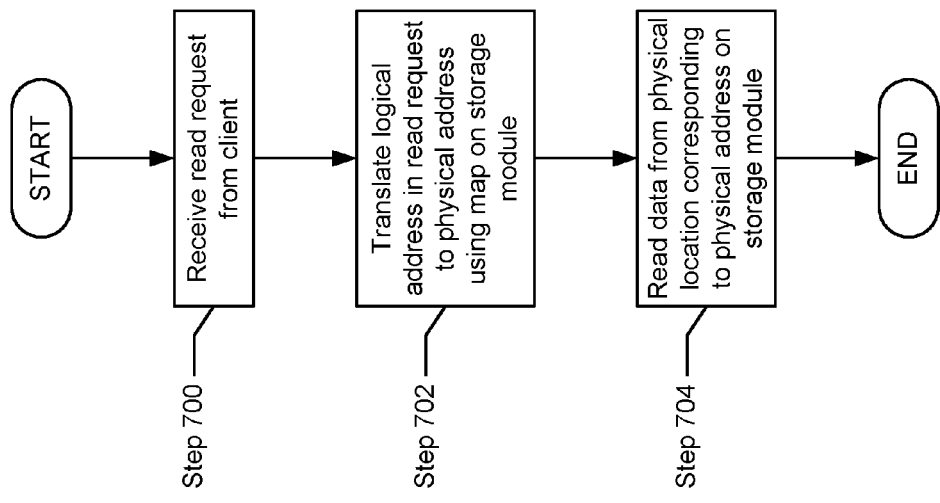

In one embodiment of the technology, the storage module controller (124) includes a processor (128) (e.g., one or more cores, or micro-cores of a processor that are configured to execute instructions), one or more hardware registers (132), and memory (130) (e.g., volatile memory that may be, but is not limited to, dynamic random-access memory (DRAM), synchronous DRAM, SDR SDRAM, and DDR SDRAM) to perform at least one of the steps described in FIGS. 3, 5, and 7. Alternatively or additionally, the storage module controller (124) may include a field-programmable gate array (FPGA) (and/or an application-specific integrated circuit (ASIC)) (126). In a storage module controller that includes an FPGA (and/or ASIC) and a processor, the FPGA and/or ASIC may primarily service read and write requests, whereas the processor may handle or support administrative tasks, including those related to, e.g., wear leveling.

One skilled in the art will recognize that the architecture of the system is not limited to the components shown in FIGS. 1A and 1B. For example, the components of the storage appliance (100) may include any number of storage modules (120A-120N). Further, the storage module controller (124) of the storage module (120) and the control module (150) of the storage appliance (100) may be equipped with central processing units (CPUs), field-programmable gate arrays (FPGAs), application-specific integrated circuits (ASICs) and/or any other type of processor, without departing from the technology. In addition, the fabric may be based on communication standards other than those discussed above, without departing from the technology.

Figure 2:
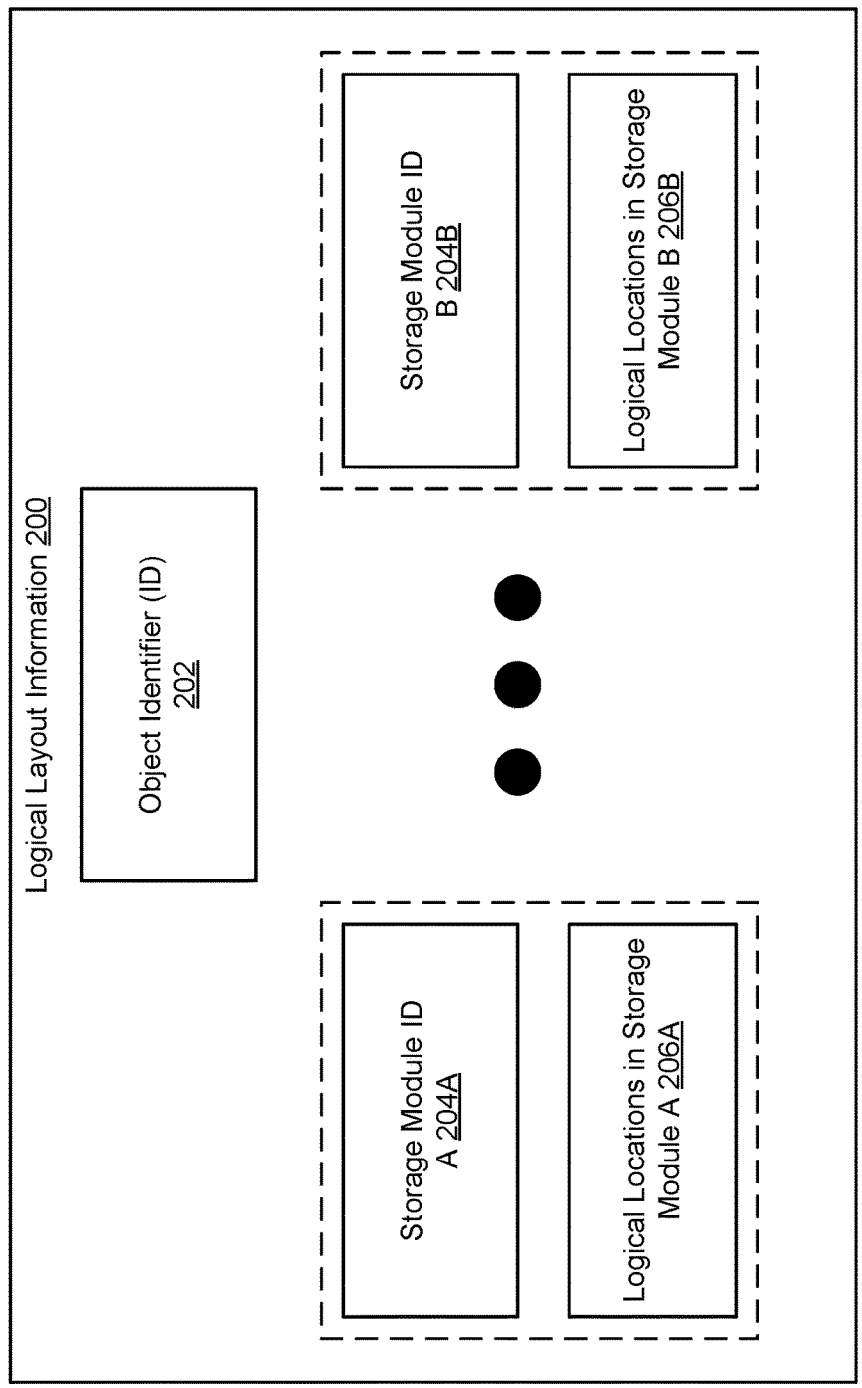
FIG. 2 shows a representation of logical layout information in accordance with one or more embodiments of the technology.

FIG. 2 shows a representation of logical layout information in accordance with one or more embodiments of the technology. In one embodiment of the technology, the storage appliance includes functionality to allocate portions of the storage pool (see e.g., FIG. 3). As part of the allocation, the control module generates logical layout information, which is subsequently provided to a client.

The logical layout provides a layer of indirection/abstraction between the physical addresses in the storage module media and the logical addresses that are used by the client. The logical layout information includes information that may be used by the client to: (i) select which storage module(s) from which to read or write data; (ii) select particular logical location(s) in the selected storage module(s), where each logical location corresponds to a physical location in the selected storage module(s); (iii) send a request (e.g., a read request or a write request) directly (i.e., without involvement of the control module) to the selected storage module(s). (See e.g., FIGS. 4, 6, 8E).

Turning to logical layout information (200) shown in FIG. 2, the logical layout information includes an object identifier (ID) (202), one or more pairs of storage module IDs (204A, 204B) and corresponding logical locations in the storage module (206A, 206B). Each of these components is described below.

In one embodiment of the technology, the Object ID (202) is a value (e.g., a numeric value or an alpha-numeric value) that uniquely identifies the logical layout information (200) for an object. The layout corresponds to a map (or set of maps) in each Storage Module that defines the relationship between logical storage addresses used by the client and the corresponding physical storage addresses within the Storage Module's media.

In one embodiment of the technology, the storage module ID (204A, 204B) uniquely identifies the storage module within the storage pool. The storage module ID corresponds to one or more pieces of information that may be used by the client to directly communicate with the particular storage module. The logical locations in the storage module (206A, 206B) correspond to specific physical locations within the particular storage module.

In one embodiment of the technology, each client may include zero, one, or more sets of logical layout information, where each set of logical layout information includes the information shown in FIG. 2 (see e.g., Example 1 below). Alternatively, each client may include a single set of logical layout information, where the single set of logical layout information includes multiple instances of logical layout information (See e.g., Example 2 below). The following are two non-limiting examples of logical layout information in accordance with one or more embodiments of the technology.

Example 1

Logical Layout Information: Object ID: 0; SM 1: [0, 1, 2]; SM 2: [3, 4, 5]

In this example, the logical layout information is uniquely identified using "Object ID:0". Further, the logical layout information includes information related to logical locations (each of which correspond to physical locations) in two different storage modules (i.e., Storage Module (SM) 1 and SM 2). Further, for each storage module (e.g., SM 1, SM 2), there is a listing of logical locations. More specifically, in SM 1, the logical locations are 0, 1, and 2 while the logical locations in SM 2 are 3, 4, and 5. Based on the aforementioned logical layout information, a client that includes this logical layout information may read from or write data to one of the three logical locations in SM 1 and/or from one of the three logical locations in SM 2.

Example 2

Logical Layout Information:
[Object ID: 0; SM 1: [0, 1, 2]; SM 2: [3, 4, 5]]
[Object ID: 1; SM 1: [0, 1, 2]; SM 3: [3, 4, 5]]

In this example, the logical layout information includes two sets of logical layout information—namely, a first set of logical layout information that is uniquely identified using "Object ID:0" and a second set of logical layout information that is uniquely identified using "Object ID:1". In this example, the client may read from and/or write to the 12 locations associated with SM 1, SM 2, and/or SM 3 using the information included in information layout information.

FIGS. 3-7 show flowcharts in accordance with one or more embodiments of the technology.

While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 3-7 may be performed in parallel with any other steps shown in FIGS. 3-7 without departing from the technology.

FIG. 3 shows a method for allocation space in a storage pool in accordance with one or more embodiments of the technology.

In Step 300, a control module receives, via the fabric, an allocation request from a client. The allocation may include an amount of space that the client is requesting to allocate. For example, the client may be requesting allocation of 50 GB of space. The client may request any amount of space without departing from the technology.

In addition, the allocation request may also include additional information that may be used by the control module to select the specific physical locations in the storage pool to allocate. For example, the allocation request may indicate that the client wants to be able to mirror the data it stores in the storage pool. In another example, the allocation request may indicate that the client would like to protect the data stored in the storage pool using a RAID (Redundant Array of Independent Disks) mechanism (e.g., RAID-4, RAID-5, etc.). The technology is not limited to the aforementioned examples.

Continuing with the discussion of FIG. 3, in Step 302, the control module selects physical locations to allocate based on information provided in the allocation request. In one embodiment of the technology, if the allocation request only specifies an amount of storage, then the control module may use any mechanism to select a sufficient number of free (or unallocated) physical locations in the storage pool. Accordingly, the physical locations that are ultimately selected may be located in one or more storage modules and/or may be contiguous or non-contiguous.

In another embodiment of the technology, if the client provides some additional information (e.g., the client indicates that they want to mirror their data), then the control module may select the physical locations taking into account both the amount of storage required and the additional information. For example, if the client requested 50 GB of space and indicated that their data is to be mirrored, then the control module may select 25 GB from a first storage module and a corresponding 25 GB from a second storage module. Similarly, if the client requested 50 GB of space and indicated that their data is to be protected using RAID-4, then the control module may select 10 GB of space on each of five different storage modules.

In one embodiment of the technology, the control module includes a global allocation map (see e.g., FIGS. 8A-8G), which tracks which physical locations in the storage pool have been allocated and which physical locations are unallocated (or free).

In Step 304, the physical locations identified in step 302 are associated with an object identifier (ID) and a map ID for each storage module that includes at least one of the physical locations. In one embodiment of the technology, the association between object ID, map ID(s) and the set of physical locations is tracked by the control module and optionally stored in the global allocation map.

In Step 306, the control module generates logical layout information corresponding to the set of physical locations selected in Step 302, wherein the logical layout information is associated with the object ID. The logical layout information is described above with respect to FIG. 2.

In Step 308, the logical layout information is sent, via the fabric, to the client (i.e., the client that issued the allocation request received in step 300).

In Step 310, a storage module that is associated with the selected set of physical locations is selected. For example, if the logical layout information is as follows: Object ID: 0; SM 1: [0, 1, 2]; SM 2: [3, 4, 5], then storage module 1 (SM 1) may be selected.

In Step 312, a storage module specific map (also referred to as a "map") is generated for the selected storage module (i.e., the storage module selected in Step 310). The map generated in Step 312 is used to translate a logical address to a corresponding physical address, where the physical address corresponds to a physical location in the storage module. Said another way, the map provides the functionality of a media translation layer (MTL) for the portion of logical locations specified in the logical layout information that have corresponding physical locations in the selected storage module. For example, if the logical layout information is Object ID: 0; SM 1: [0, 1, 2]; SM 2: [3, 4, 5], then the map for SM 1 is used to translate the logical locations [0, 1, 2] to corresponding physical locations. In one embodiment of the technology, the map does not include information to translate logical locations [3, 4, 5] in SM 2.

In one embodiment of the technology, the map is implemented as a function which takes a logical address as input and returns a corresponding physical address as output. Alternatively, the map is implemented as one or more look-up tables in which a given logical address is used to located a corresponding entry in the look-up table(s), where the correspond entry includes the physical address that corresponds to the logical address. The map may be implemented using other mechanisms without departing from the technology.

In Step 314, object ID (which may be included within the map) and the map (which may include the map ID) generated in Step 312 are sent, via the fabric, to the storage module selected in Step 310. The storage module, upon receipt of the map, stores the map. The specific location in which the map is stored may vary based on the implementation. For example, the map may be stored in the memory, the hardware registers, and/or in the solid state memory. Further, if the map is a function, then storing the map may further include programming the FPGA (or ASIC) to implement the function.

In Step 316, a determination is made about whether there are any additional storage modules associated with the set of physical locations (determined in step 302) for which a map has not be created. If any such additional storage modules exist, the process proceeds to Step 310; otherwise, the process ends.

The process shown in FIG. 3 may be performed each time a client requests the allocation of space in the storage pool. All or a portion of the process shown in FIG. 3 may be performed concurrently for multiple clients connected to the storage appliance.

In one embodiment of the technology, the process shown in FIG. 3 results in each client having its own distinct set of logical location information. Said another way, each client only includes logical location information for the space in the storage pool that it was allocated. Accordingly, while the control module may include information about how the various portions of the storage pool are allocated to the various clients, the specific clients may only be aware of the portions of storage that they have been allocated. Further, each of the storage modules only includes a map(s) for portions of its solid state memory that have been allocated. However, a given storage module may not include any information about how other portions of other solid state modules have been allocated.

In one embodiment of the technology, each storage module maintains its own object descriptor table that provides a mapping between object ID and map ID. The object descriptor table may be updated each time a storage module receives a map ID and the corresponding map. In another embodiment of the technology, the map ID is included in the map and the object descriptor table may be updated each time a storage module receives the map.

Figure 6:
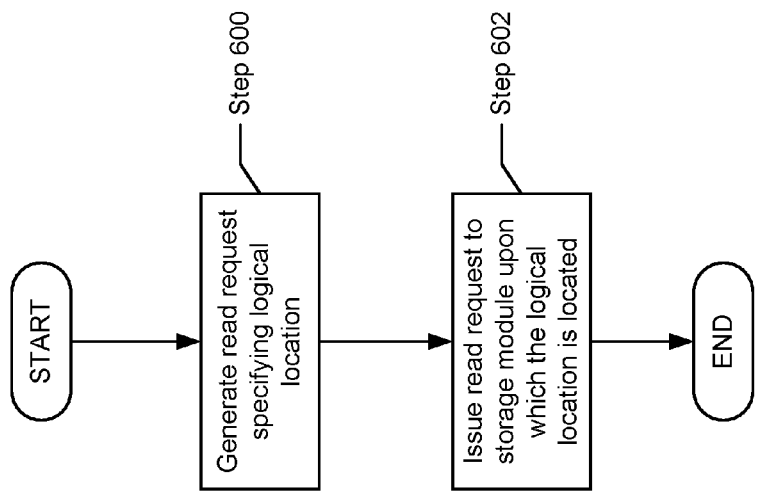

In one embodiment of the technology, after the process shown in FIG. 3 is completed, the client (using the logical location information) includes information that may be used to generate logical addresses to include in read and/or write requests (see e.g., FIGS. 4 and 6). Further, the storage modules that include physical locations corresponding to the logical addresses include functionality (i.e., one or more maps) to translate the logical addresses in the aforementioned requests to corresponding physical addresses.

FIG. 4 shows a method for issuing a write request by a client to the storage appliance in accordance with one or more embodiments of the technology.

In Step 400, the client selects a logical location in the storage pool in which to write data. In one embodiment of the technology, the logical layout information is used to select the logical location. For example, if the logical layout information is: Object ID: 0; SM 1: [0, 1, 2]; SM 2: [3, 4, 5] and the logical layout information indicates that the data is to be striped across the two SMs, then the client may select from one of six logical locations.

In Step 402, the client generates a write request that specifies the logical location and the data to write to the logical location. In one embodiment of the technology, the logical location may be specified in the write request as a logical address. In such embodiments the logical address may uniquely identify the logical location within the specific storage module in which the physical location corresponding to the logical location is located (see e.g., example in FIGS. 8A-8G).

In Step 404, the write request is transmitted from the client, via the fabric, to the specific storage module in which the physical location corresponding to the logical location is located. Continuing with the above example, the write request is issued directly to storage module 1. As discussed above, the logical layout information may include information such as the storage module ID (see e.g., FIG. 2), which may be used to directly send the write request to the appropriate storage module. In one embodiment of the technology, the write request may include, for example, the selected storage module ID, the object ID referring to the logical layout information, the logical location (e.g., a logical address and/or an offset) to be written, the length of the data to be written, and the address of the new data in the client's memory. The storage module subsequently receives the write request and services the write request in accordance with FIG. 5.

FIG. 5 shows a method for servicing a write request by the storage appliance. In Step 500, the write request is received from the client. In one embodiment the write request is received via the fabric.

In Step 502, the logical address in the write request is translated to a physical address using a map. More specifically, the object ID in the write request is used to lookup the corresponding Map ID using an object descriptor table that is stored in the storage module. The map corresponding to the Map ID is then used to translate the logical address in the write request to a corresponding physical address. In one embodiment of the technology, if the storage module includes multiple maps, then the logical address, other information in the write request (or information derived from other information in the write request), and/or information determined using at least a portion of the logical address may be used to select the appropriate map. Once the appropriate map is selected, the aforementioned translation is performed.

In one embodiment of the technology, the map is implemented as a function. In such cases, the logical address is provided as input to the function and the result of applying the function to the logical address is a corresponding physical address.

In one embodiment of the technology, the map is implemented as a look-up table. In such cases, the logical address (or a value derived using all or a portion of the logical address, e.g., a hash of the logical address) is used to identify an entry in the look-up, where the entry includes a physical address corresponding to the logical address.

In Step 504, the data specified in the write request is written to the physical location (which corresponds to the physical address) in the storage module.

FIG. 6 shows a method for issuing a read request by a client to the storage appliance in accordance with one or more embodiments of the technology.

In Step 600, the client selects a logical location in the storage pool from which to read data and then generates a corresponding read request. In one embodiment of the technology, the logical layout information is used to select the logical location. For example, if the logical layout information is: Object ID: 0; SM 1: [0, 1, 2]; SM 2: [3, 4, 5] and the and the logical layout information indicates that the data is to be striped across the two SMs, then the client may select from one of six logical locations. The client then generates a read request that specifies the logical location. In one embodiment of the technology, the logical location may be specified in the read request as a logical address. In such embodiments, the logical address may uniquely identify the logical location within the specific storage module in which the physical location corresponding to the logical location is located (see e.g., example in FIGS. 8A-8G).

In Step 602, the read request is transmitted from the client, via the fabric, to the specific storage module in which the physical location corresponding to the logical location is located. More specifically, the object ID in the read request is used to lookup the corresponding Map ID using an object descriptor table that is stored in the storage module. The map corresponding to the Map ID is then used to translate the logical address in the read request to a corresponding physical address. Continuing with the above example, the read request is issued directly to storage module 1. As discussed above, the logical layout information may include information such as the storage module ID (see e.g., FIG. 2), which may be used to directly send the read request to the appropriate storage module. The storage module subsequently receives the read request and services the read request in accordance with FIG. 6.

FIG. 7 shows a method for servicing a read request by a storage appliance in accordance with one or more embodiments of the technology.

In Step 700, the read request is received from the client. In one embodiment the read request is received via the fabric.

In Step 702, the logical address in the read request is translated to a physical address using a map. In one embodiment of the technology, if the storage module includes multiple maps, then the logical address, other information in the write request (or information derived from other information in the write request), and/or information determined using at least a portion of the logical address may be used to select the appropriate map. Once the appropriate map is selected, the aforementioned translation is performed.

In one embodiment of the technology, the map is implemented as a function. In such cases, the logical address is provided as input to the function and the result of applying the function to the logical address is a corresponding physical address.

In one embodiment of the technology, the map is implemented as a look-up table. In such cases, the logical address (or a value derived using all or a portion of the logical address, e.g., a hash of the logical address) is used to identify an entry in the look-up, where the entry includes a physical address corresponding to the logical address.

In Step 704, the data specified in the read request is written to the physical location (which corresponds to the physical address) in the storage module.

Example Use Case

The use case scenario described below is intended to provide an example of the various embodiments of the technology. The technology is not limited to the following use case scenario. More specifically, one skilled in the art will recognize that the methods described in FIGS. 3-7 are not limited to the use case scenario described below, but rather are universally applicable to a wide range of storage appliances of different configuration, complexity and size.

Figure 8A:
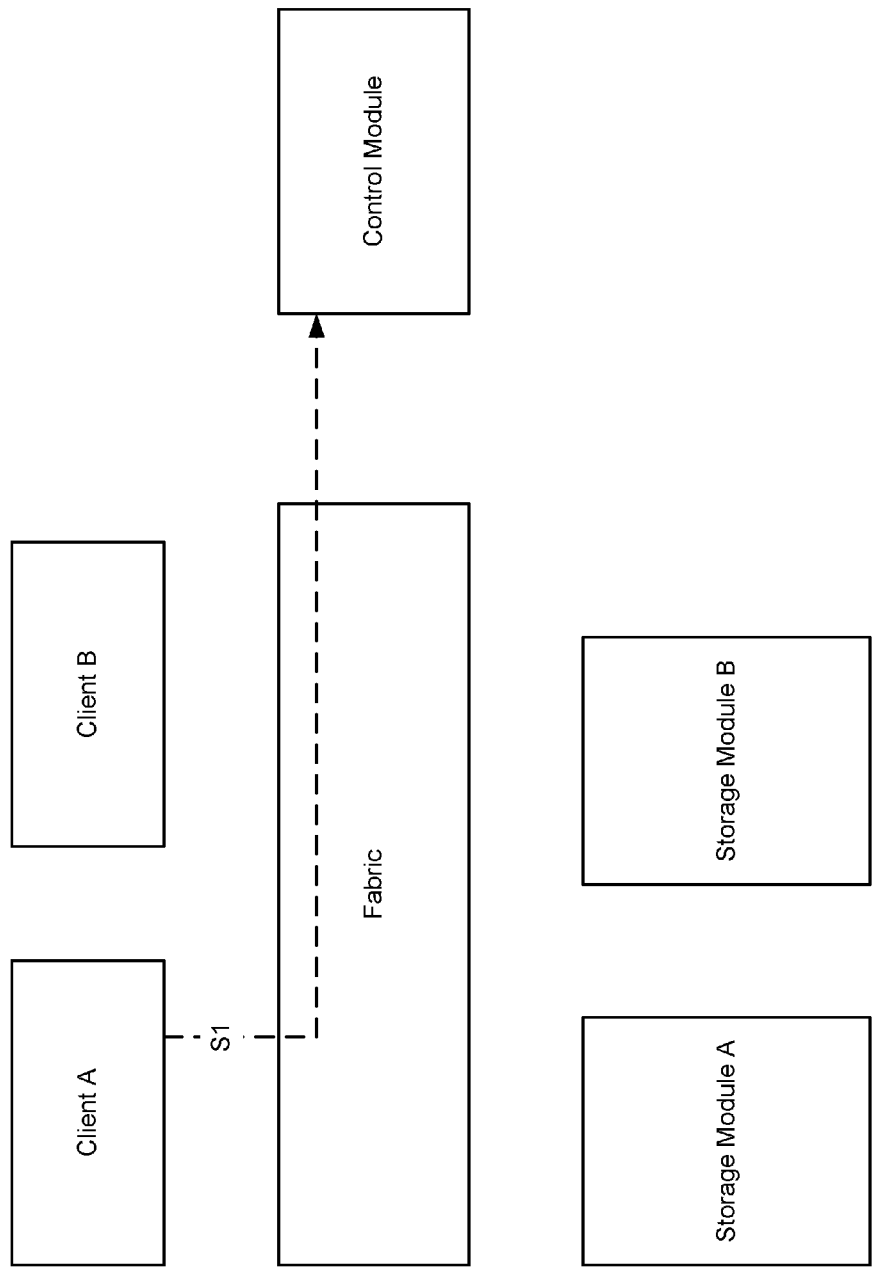
FIGS. 8A-8G shows an example in accordance with one or more embodiments of the technology.

Referring to FIG. 8A, consider a scenario in which there are two clients (client A, client B) operatively connected to a control module and two storage modules (storage module A, storage module B) via a fabric. At some point in time, client A issues an allocation request (S1) to the control module.

Figure 8B:
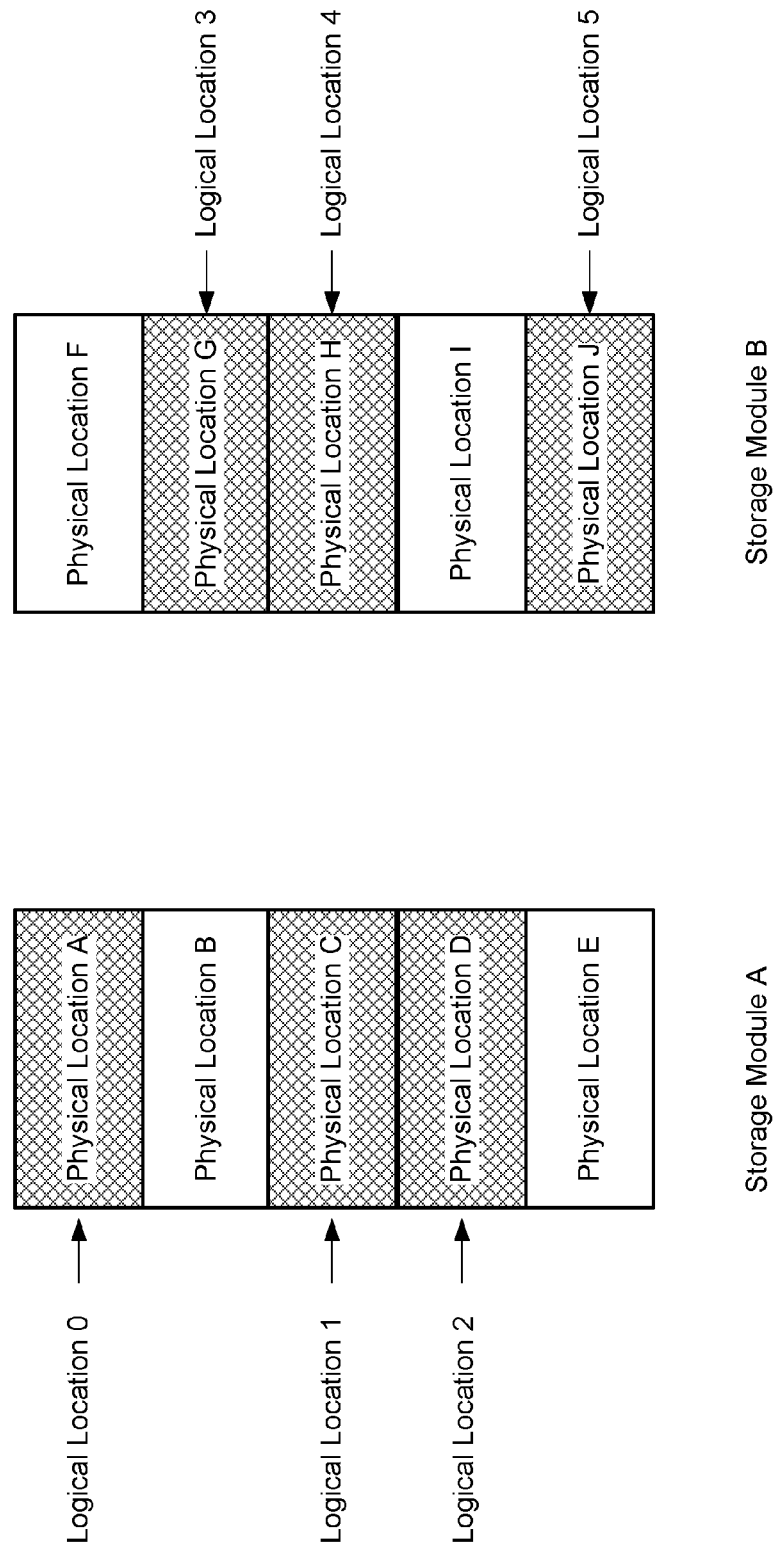

Referring to FIG. 8B, in response to receiving the allocation request, the control module selects the following set of physical locations in the storage modules: (i) storage module A: physical location A, physical location C, and physical location D and (ii) storage module B: physical location G, physical location H, and physical location J.

Figure 8C:
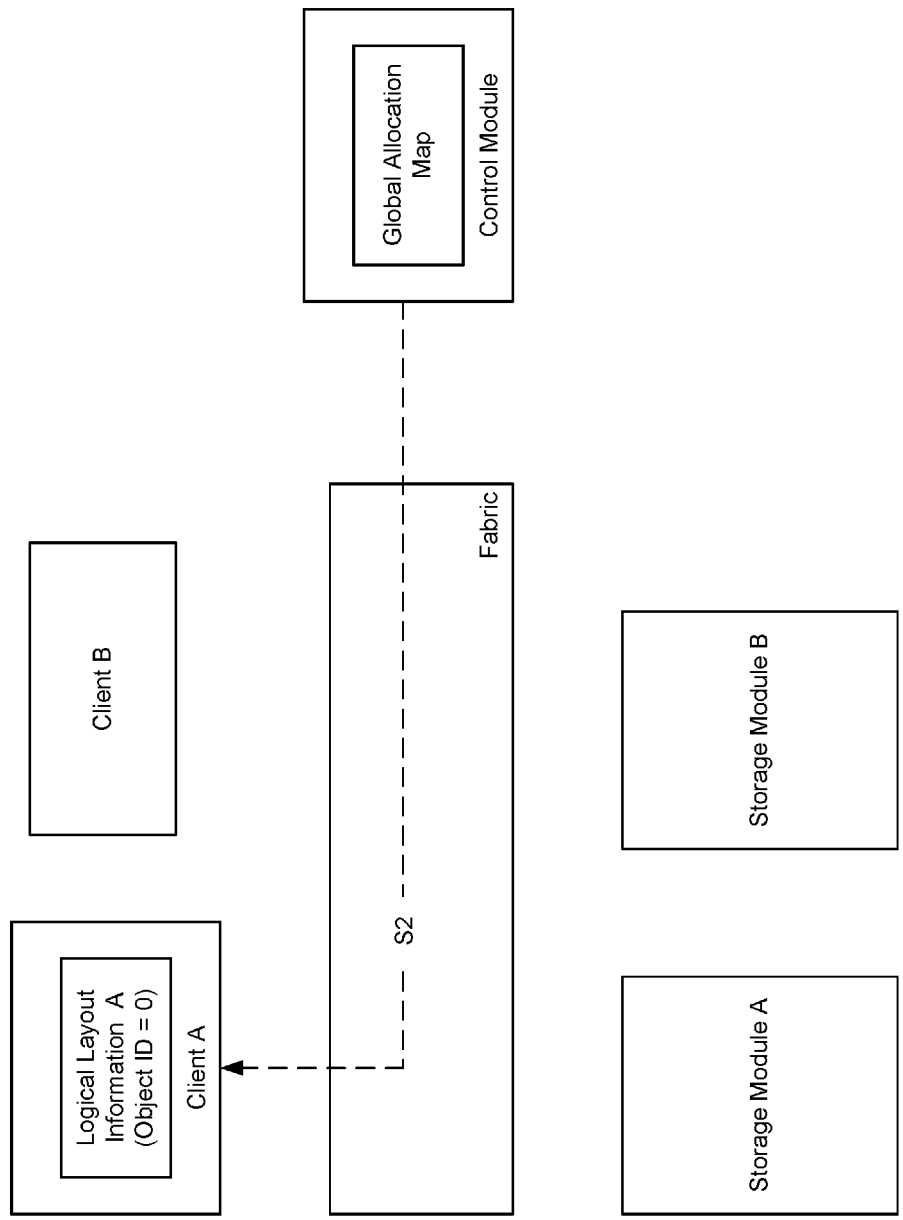
Figure 8D:
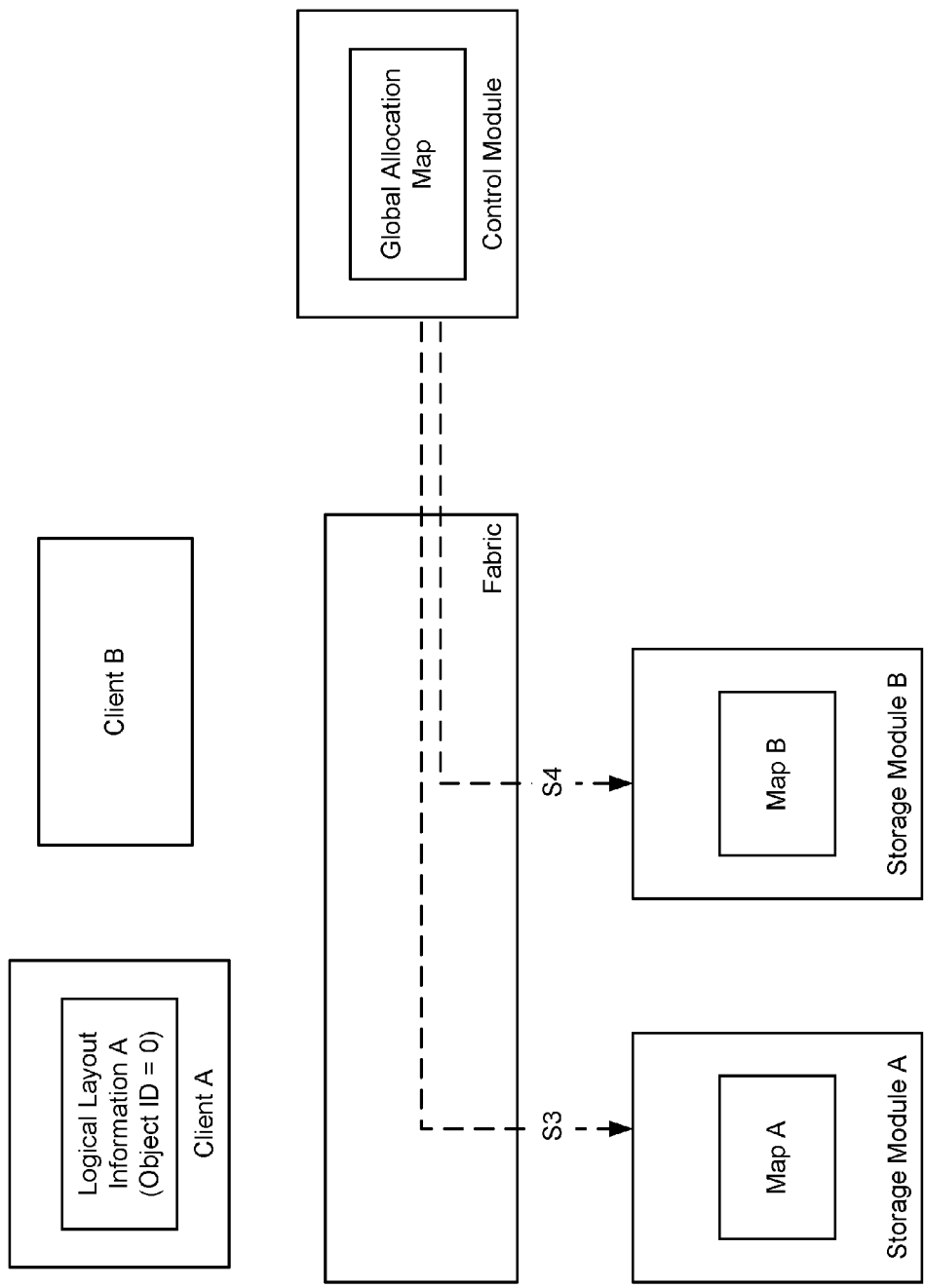

Referring to FIGS. 8C and 8D, after selecting the aforementioned set of physical locations, the control module updates a global allocation map to reflect that these physical locations have been allocated. Further, the control module associates an object ID (i.e., Object ID=0) to the set of physical locations and then generates logical layout information A. Logical layout information A specifies the logical locations corresponding to the set of selected physical locations. Accordingly, in this example, logical layout information A specifies the following: Object ID=0; SM A: [0, 1, 2]; SM B: [3, 4, 5].

In addition, the control module generates a map for storage module A (i.e., Map A) and a map for storage module B (i.e., Map B). In this example, Map A is used to translate logical addresses which correspond to logical locations 0, 1, and 2, to physical addresses corresponding to physical locations A, C, and D in Storage Module A, respectively. Further, Map B is used to translate logical addresses which correspond to logical locations 3, 4, and 5, to physical addresses corresponding to physical locations G, H, and J in Storage Module B, respectively.

The control module subsequently sends logical layout information A to client A via the fabric (see FIG. 8C, S2), map A to storage module A (see FIG. 8D, S3), and map B to storage module B (see FIG. 8D, S4).

Figure 8E:
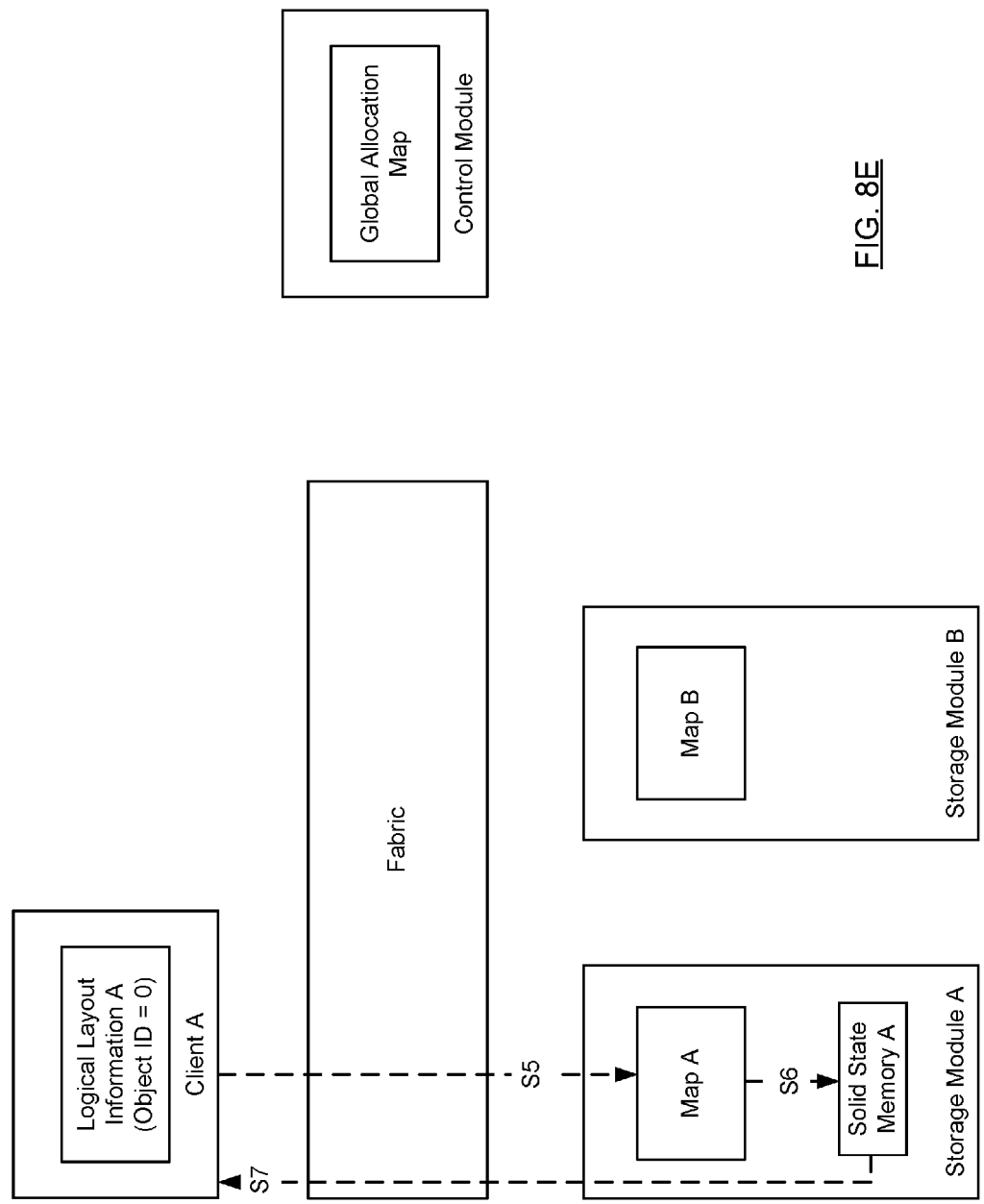

Referring to FIG. 8E, at some point after S1-S4 have been performed, client A generates and issues (via the fabric) a read request (see FIG. 8E, S5) to storage module A. In this example, the read request is for logical location 1 (which corresponds to logical address 1) in storage module A.

In S6, storage module A receives the read request that includes Object ID 0, determines that Object ID 0 is represented by Map A. Map A is subsequently used to translate logical address 1 to the corresponding physical address C in storage module A. In S7, the data located at physical location C is subsequently read from solid state memory A and sent (via the fabric) to client A.

Figure 8F:
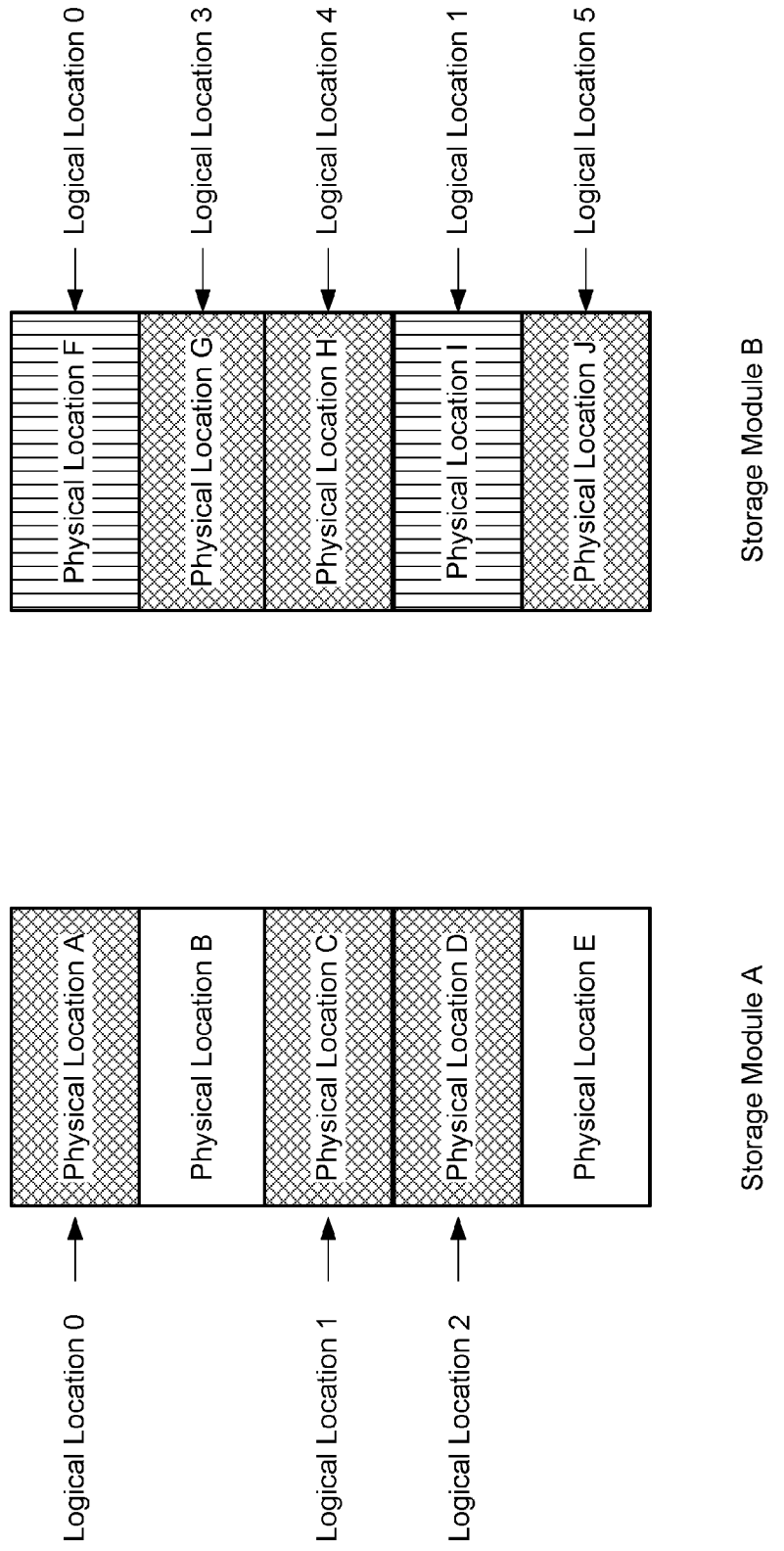

Referring to FIG. 8F, after S1-S7 have been performed, assume that client B issues an allocation request to the control module. In this example, the control module selects the following set of physical locations in storage module B: physical location F and physical location I.

Figure 8G:
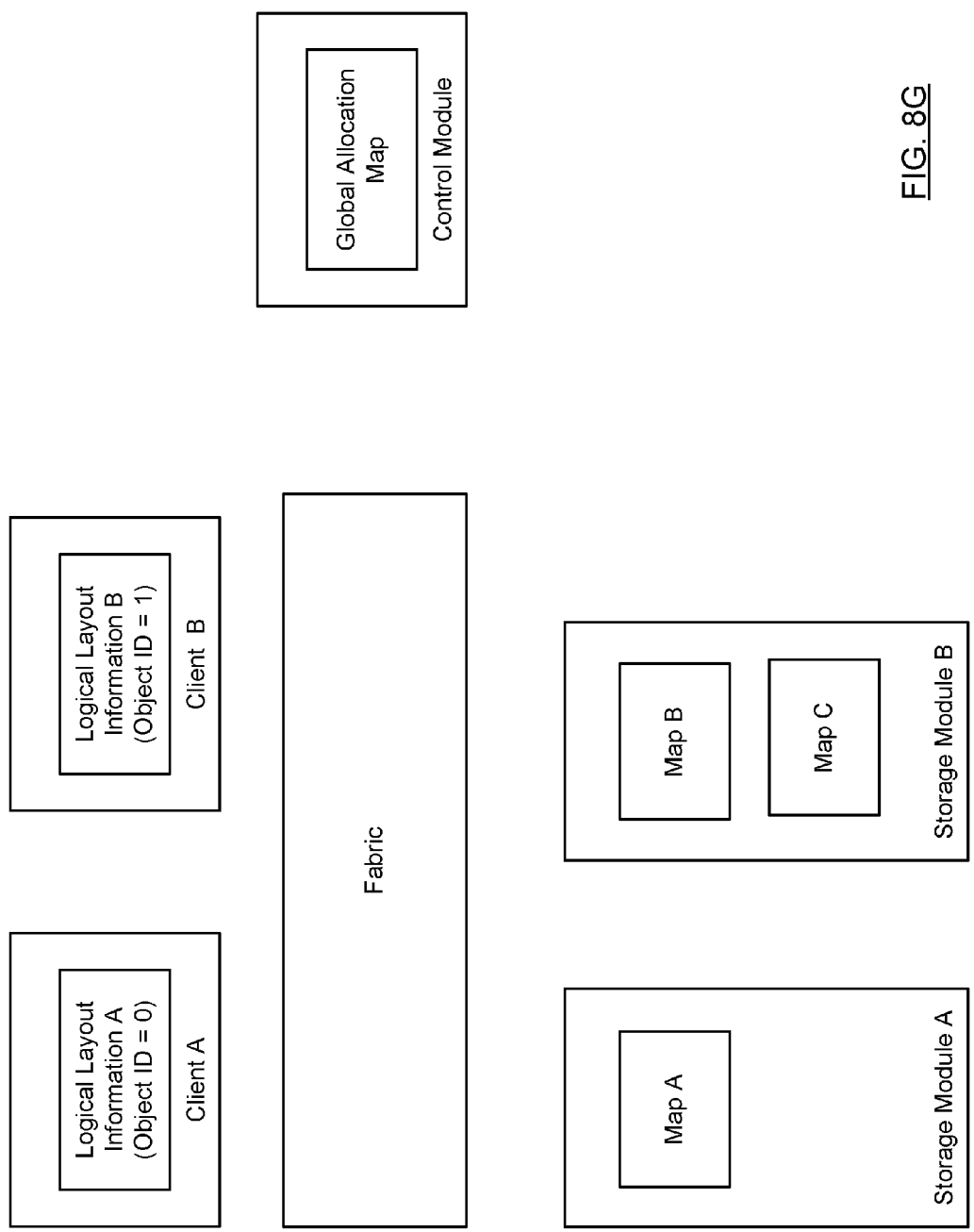

Referring to FIG. 8G, after selecting the aforementioned set of physical locations, the control module updates a global allocation map to reflect that these physical locations have been allocated. Further, the control module associates an object ID (i.e., Object ID=1) and a map ID (i.e., Map C in this example) to the set of physical locations and then generates logical layout information B. Logical layout information B specifies the logical locations corresponding to the set of selected physical locations. Accordingly, in this example, logical layout information A specifies the following: Object ID=1; SM B: [0, 1].

In addition, the control module generates a map for storage module B (i.e., Map C). In this example, Map C is used to translate logical addresses which correspond to logical locations 0 and 1 to physical addresses corresponding to physical locations F and I, respectively. The control module subsequently sends logical layout information B to client B via the fabric and Map C to storage module B via the fabric.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for servicing requests by a storage appliance, comprising:
   allocating, by a control module in the storage appliance, a set of physical locations in a storage pool in the storage appliance;
   sending, by the control module, logical layout information associated with the set of physical locations to a client operatively connected to the storage appliance;
   sending, by the control module, a first map to a first storage module in the storage pool, wherein at least one physical location in the set of physical locations is located on the first storage module;
   receiving, by the first storage module, a first request from the client, wherein the first request comprises information based, at least in part, on the logical layout information; and
   servicing, by the first storage module, the first request using the first map.

2. The method of claim 1, further comprising:
   prior to allocating the set of physical of locations:
   receiving, by the control module, an allocation request from the client, wherein the allocation request specifies an amount of space to allocate in the storage pool.

3. The method of claim 1, wherein the logical layout information comprises an object identifier (ID), wherein the object ID is associated with the set of physical locations.

4. The method of claim 3, wherein the logical layout information further comprises an offset corresponding to at least one physical location in the set of physical locations.

5. The method of claim 1, wherein the set of physical locations comprises at least one physical location on a second storage module in the storage pool.

6. The method of claim 5, further comprising:
   sending a second map to the second storage module in the storage pool, wherein the at least one physical location in the set of physical locations is located on the second storage module.

7. The method of claim 6, further comprising:
   receiving a second request from the client; and
   servicing the second request using the second map, wherein the second request specifies an object ID, wherein the object ID is associated with the set of physical locations.

8. The method of claim 1, wherein the first request comprises a logical address and wherein servicing the first request comprises using the first map to translate the logical address to a physical address, wherein the physical address corresponds to a physical location on the first storage module, wherein the physical location is in the set of physical locations.

9. The method of claim 8, wherein the logical layout information comprises an object identifier (ID), wherein the object ID is associated with the set of physical locations.

10. The method of claim 1, wherein the logical layout information comprises a plurality of offsets, wherein each of the plurality of offsets is associated with a physical location in the set of physical locations.

11. The method of claim 1, wherein the first request is one selected from a group consisting of a read request and a write request.

12. The method of claim 1, wherein the first map is a look-up table.

13. The method of claim 1, wherein the first map is a function to translate a logical address in the first request to a physical address associated with a physical location in the first storage module.

14. A method for servicing requests by a storage appliance, comprising:
   allocating, a control module in the storage appliance, a set of physical locations in a storage pool in the storage appliance;
   sending, by the control module, logical layout information associated with the set of physical locations to a client operatively connected to the storage appliance, wherein the logical layout information is associated with an object identifier (ID);
   sending, by the control module, a first map to a first storage module in the storage pool, wherein at least one physical location in the set of physical locations is located on the first storage module, wherein the first map is associated with a map identifier (ID);
   sending, by the control module, a second map to a second storage module in the storage pool, wherein at least one physical location in the set of physical locations is located on the second storage module, wherein the second map is associated with the map ID;

receiving, by the first storage module, a first request from the client comprising a logical address, wherein the logical address comprises the object ID and first offset; and servicing, by the first storage module, the first request using the first map, wherein the first request is one selected from a group consisting of a read request and a write request, wherein the first map is identified using the object ID;

receiving, by the second storage module, a second request from the client comprising a second logical address, wherein the second logical address comprises the object ID and second offset; and servicing, by the second storage module, the second request using the second map, wherein the second map is identified using the object ID.

15. The method of claim 14, wherein the first map is different than the second map.

16. The method of claim 14, wherein the first map only comprises information associated with physical locations in the set of physical locations located on the first storage module and wherein the second map only comprises information associated with physical locations in the set of physical locations located on the second storage module.

17. A storage appliance, comprising:
a fabric;
a storage pool operatively connected to the fabric and comprising a plurality of physical storage modules, and
a control module operatively connected to the fabric and programmed to:
  allocate a set of physical locations in the storage pool;
  send, using the fabric, logical layout information associated with the set of physical locations to a client operatively connected to the storage appliance;
  send, using the fabric, a map to a storage module in the plurality of storage modules, wherein at least one physical location in the set of physical locations is located on the storage module;
the storage module programmed to:
  receive, from the fabric, a request from the client, wherein the request is one selected from a group consisting of a read request and a write request; and
  obtaining the map using at least a portion of the request and an object descriptor table in the storage module; and
  service the request using the map.

18. The storage appliance of claim 17, wherein the storage module comprises solid state memory.

19. The method of claim 17, wherein the storage module comprises a plurality of maps, wherein the map is one of the plurality of maps, wherein the request comprises the object ID, and wherein servicing the request comprises using the object ID to identify the map.

20. The method of claim 17, wherein the request comprises a logical address, and wherein the map is used to translate the logical address into a physical address corresponding to a physical location on the storage module.

* * * * *